(12) United States Patent
Kuo

(10) Patent No.: US 11,713,737 B1
(45) Date of Patent: Aug. 1, 2023

(54) FUEL-EFFICIENT AND FUEL-SAVING DEVICE

(71) Applicant: Wei-Ling Kuo, Kaohsiung (CN)

(72) Inventor: Wei-Ling Kuo, Kaohsiung (CN)

( * ) Notice: Subject to any disclaimer, the term of this patent is extended or adjusted under 35 U.S.C. 154(b) by 0 days.

(21) Appl. No.: 18/071,634

(22) Filed: Nov. 30, 2022

(30) Foreign Application Priority Data

Sep. 28, 2022 (CN) .......................... 202211190402.3

(51) Int. Cl.
| | | |
|---|---|---|
| *F02M 27/04* | (2006.01) | |
| *F02M 37/00* | (2006.01) | |
| *C04B 33/04* | (2006.01) | |
| *F02M 29/04* | (2006.01) | |
| *B01F 23/21* | (2022.01) | |
| *C04B 33/13* | (2006.01) | |
| *B01F 33/25* | (2022.01) | |
| *B01F 101/00* | (2022.01) | |

(52) U.S. Cl.
CPC ............. *F02M 27/04* (2013.01); *B01F 23/21* (2022.01); *B01F 33/251* (2022.01); *C04B 33/04* (2013.01); *C04B 33/131* (2013.01); *F02M 29/04* (2013.01); *F02M 37/0047* (2013.01); *F02M 37/0082* (2013.01); *B01F 2101/503* (2022.01)

(58) Field of Classification Search
CPC .... F02M 27/04; F02M 29/04; F02M 37/0047; F02M 37/0082; B01F 23/21; B01F 33/251; B01F 2101/503; C04B 33/04; C04B 33/121
See application file for complete search history.

(56) References Cited

U.S. PATENT DOCUMENTS

| | | | | | |
|---|---|---|---|---|---|
| 5,873,353 | A | * | 2/1999 | Makita ................... | F02M 27/06 123/538 |
| 6,082,339 | A | * | 7/2000 | Wey ....................... | F02M 27/06 123/538 |
| 7,487,763 | B2 | * | 2/2009 | Miyasaka ................ | C01B 3/38 123/538 |

(Continued)

FOREIGN PATENT DOCUMENTS

| | | | | |
|---|---|---|---|---|
| CN | 107142789 A | * | 9/2017 | ............. D21H 15/10 |
| CN | 111732409 A | * | 10/2020 | ............. D21H 15/10 |

(Continued)

*Primary Examiner* — Grant Moubry
*Assistant Examiner* — James G Moubry
(74) *Attorney, Agent, or Firm* — Bayramoglu Law Offices LLC

(57) ABSTRACT

A fuel-efficient and fuel-saving device is provided and includes a first fuel-modification device, an air-refining device, and a tubing-type fuel-modification device. The first fuel-modification device is arranged in a fuel tank. The air-refining device is arranged under a filter screen of an air filter of an internal combustion engine, and the tubing-type fuel-modification device is arranged above a pipeline between the internal combustion engine and the fuel tank. The first fuel-modification device includes a first metal box body and a plurality of nano far-infrared ceramic particles. The surface of the first metal box body has a plurality of uniformly arranged air holes. The plurality of nano far-infrared ceramic particles is arranged in the first metal box body. The ball diameter of the nano far-infrared ceramic particles is larger than the diameter of the air holes.

9 Claims, 4 Drawing Sheets

(56) References Cited

U.S. PATENT DOCUMENTS

| | | | | |
|---|---|---|---|---|
| 7,617,815 B2 * | 11/2009 | Wey | ........................ | F02M 27/04 |
| | | | | 123/538 |
| 8,176,899 B2 * | 5/2012 | Lee | ...................... | F02M 27/065 |
| | | | | 123/538 |
| 8,887,697 B2 * | 11/2014 | Wey | ........................ | F02M 27/06 |
| | | | | 123/538 |
| 10,371,105 B1 * | 8/2019 | Grovatt | ................... | F02M 27/06 |
| 2006/0059876 A1 * | 3/2006 | Yuan | ....................... | F02M 27/02 |
| | | | | 55/486 |
| 2012/0247000 A1 * | 10/2012 | Wey | .......................... | C10L 3/06 |
| | | | | 422/186 |

FOREIGN PATENT DOCUMENTS

| | | | | | |
|---|---|---|---|---|---|
| EP | | 384943 A | * | 9/1990 | .............. F02B 51/06 |
| WO | WO-2008054753 A2 | * | 5/2008 | .............. F02M 27/04 |

* cited by examiner

FUEL-EFFICIENT AND FUEL-SAVING DEVICE

CROSS REFERENCE TO THE RELATED APPLICATIONS

This application is based upon and claims priority to Chinese Patent Application No. 202211190402.3, filed on Sep. 28, 2022, the entire contents of which are incorporated herein by reference.

TECHNICAL FIELD

The present invention belongs to the technical field of a fuel-saving device of an internal combustion engine, particularly a fuel-efficient and fuel-saving device.

BACKGROUND

Current combustion devices typically use petroleum refiners to bring fuel oil/gas into the engine chamber to atomize the mixture so that the mixture is ignited or compressed to generate kinetic energy. However, waste is often caused due to incomplete fuel combustion, which affects the efficiency of the energy output of the combustion device, causes carbon deposition by the combustion device, and easily emits waste gas that is incompletely combusted, thereby polluting the environment. Currently, there are many ways to solve these problems, for example, adding a fuel booster, using a carbon removal agent, etc. The far infrared fuel-saving device is the most notable among the many types of fuel-saving equipment.

At present, known fuel-saving devices are mainly provided with a fixed gland cover, a combination of nano far-infrared ceramic particles and a metal box body, and a fixed belt. A buckling groove is arranged on each of the front and rear sides of the fixed gland cover. The far-infrared plate and the fixed gland cover are placed on an oil inlet pipe in sequence, and they are fastened to the oil inlet pipe by inserting the fixed belt through the buckling groove of the fixed gland cover. In this way, the molecules of the fuel in the oil inlet pipe are modified through the penetrating power and the emissivity of the far-infrared plate.

However, this fuel-saving device is complicated to be manufactured and installed; the buckle grooves are needed to run through the fixed cover; installation is not easy due to the bending degree of the oil/gas pipe and the design space of the combustion device, and there is a possibility that the belt may break due to age and the high-temperature environment such that the equipment may detach or fall off. In addition, a plastic pipe wall or a metal pipe wall separates the far-infrared plate from the fuel/gas, so the far-infrared plate is not in direct contact with the fuel/gas, which is not effective, especially when the fuel/gas flows fast.

Therefore, providing a fuel-efficient and fuel-saving device that is easy to install and can effectively increase fuel combustion efficiency is urgent for those skilled in the art.

SUMMARY

Given the above, the present invention provides a fuel-efficient and fuel-saving device. The present invention improves the combustion efficiency of fuel by arranging several modification devices in different parts of the automobile and making the fuel be contacted directly through air holes.

To achieve the above purposes, the present invention adopts the following technical solution: a fuel-efficient and fuel-saving device, which includes a first fuel-modification device, an air-refining device, and a tubing-type fuel-modification device. The first fuel-modification device is arranged in a fuel tank. The air-refining device is arranged under a filter screen of an air filter of an internal combustion engine, and the tubing-type fuel-modification device is arranged above a pipeline between the internal combustion engine and the fuel tank. The first fuel-modification device includes a first metal box body and a plurality of nano far-infrared ceramic particles. The surface of the first metal box body has a plurality of uniformly arranged air holes. The nano far-infrared ceramic particles are arranged in the first metal box body. The ball diameter of the nano far-infrared ceramic particles is larger than the diameter of the air holes.

Further, the air-refining device includes a second metal box body and a plurality of nano far-infrared ceramic particles. The surface of the second metal box body has a plurality of uniformly arranged air holes. The nano far-infrared ceramic particles are arranged in the second metal box body, and the ball diameter of the nano far-infrared ceramic particles is larger than the diameter of the air holes.

Further, the tubing-type fuel-modification device includes a metal cylinder body and a second fuel-modification device. A plurality of tubular channels is arranged on the inside of the metal cylinder body. A hollow interface is arranged on both sides of the metal cylinder body. One end of the hollow interface is in communication with an inlet pipe, and the other end of the hollow interface is in communication with an outlet pipe. Slots are arranged in the tubular channels. Elastic buckles are arranged in the slots. The elastic buckles are internally fixed with the second fuel-modification device.

Further, the structure of the first fuel-modification device and the structure of the second fuel-modification device are the same.

Further, the weight ratio of the composition of the nano far-infrared ceramic particles is 90% of kaolin and 10% of the remaining mixture. The weight ratio of the composition of the remaining mixture is 30%-40% of nano-titanium dioxide, 50%-70% of nano-zirconia, and 10%-20% of nano-tourmaline.

Further, the particle size of the nano-titanium dioxide, the nano-zirconia, and the nano-tourmaline is independently 1000-10000 mesh.

Further, the first metal box body includes a box body and a box cover. The box cover is covered on the box body, and the bottom ends of the box cover and the box body are chamfered.

Further, the first metal box body is a cuboid structure. The upper end and the lower end of the first metal box body are provided with arc-shaped grooves.

Further, the second metal box body is a cylindrical structure. The upper end and the lower end of the second metal box body are provided with arc chamfers.

The advantages of the present invention are the following:

The arrangement of the first fuel-modification device, the air-refining device, and the tubing-type fuel-modification device facilitates the installation in a car body. The design of the cylinder structure of the second metal box body facilitates the placement into a cylindrical pipeline. The provision of the air holes and the arc-shaped grooves allows fuel to be in direct contact with nano far-infrared ceramic particles and decreases the movement space of the nano far-infrared ceramic particles, which increases the contact area between fuel and the nano far-infrared ceramic particles and thus improves the effect of the modification. The flat cuboid structure of the first fuel-modification device is convenient for the first fuel-modification device to be sunk to the bottom of the fuel tank, thereby avoiding rolling in the fuel tank due to the high speed of vehicles. Chamfering also reduces the probability of rolling and avoids the danger caused by hanging the fuel-modification device in the fuel tank. The nano far-infrared rays are used to promote the stretch of molecular bonds and vibration of the carbon-hydrogen molecules to increase the kinetic energy of the molecular bonds so that the molecular bonds are easier to break into smaller free radicals in the combustion process. This increases the possibility of fully and evenly mixing with oxygen for combustion.

In the figures: 1. first fuel-modification device; 2. first metal box body; 201. box cover; 202. box body; 3. second metal box body; 4. metal cylinder body; 401. tubular channels; 402. hollow interface; 403. elastic buckles; 5. nano far-infrared ceramic particles; 6. second fuel-modification device.

DETAILED DESCRIPTION OF THE EMBODIMENTS

The technical solution in the embodiment of the present invention will be clearly and completely described below in conjunction with the attached drawings in the embodiment of the present invention.

In the description of the present invention, it should be noted that the orientation or position relationship indicated by the terms "up," "down," "left," "right," "level," "inside," "outside," etc., is based on the orientation or position relationship shown in the attached drawings only to describe the present invention and simplify the description, rather than indicating or implying that the device or element indicated must have a specific orientation or be constructed and operated in a specific orientation, and therefore should not be construed as a limitation of the present invention. The terms "first," "second," and "third" are only used to describe distinct features and cannot be understood as instructions or indications of relative importance. In addition, unless otherwise noted, the terms "installation," "connected," and "linked" should be given the broadest interpretation. For example, it can be a fixed, detachable, or integral connection; a mechanical or an electrical connection; directly or indirectly connected through an intermediary, or a connection between two components. For those skilled in the art, the specific meaning of the above terms in the present invention can be understood based on the specific circumstances.

Embodiment 1

Figure 1:
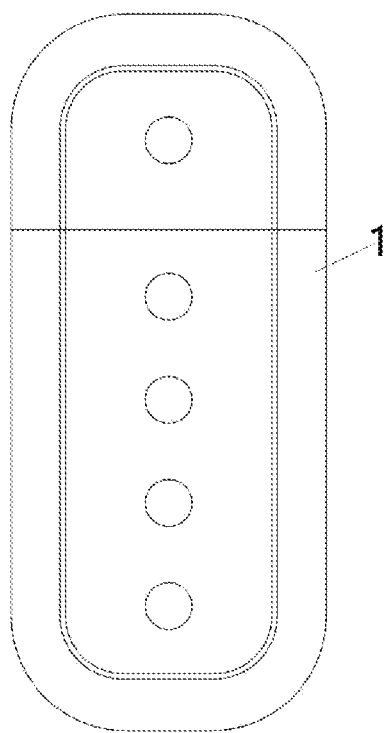
FIG. 1 is a front view of a first fuel-modification device of the present invention.
Figure 2:
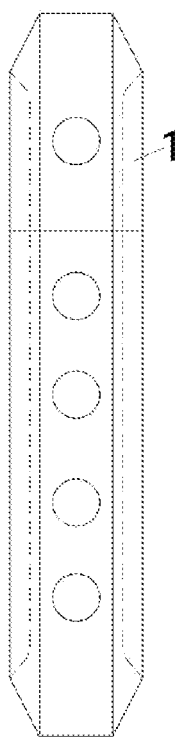
FIG. 2 is a side view of the first fuel-modification device of the present invention.
Figure 3:
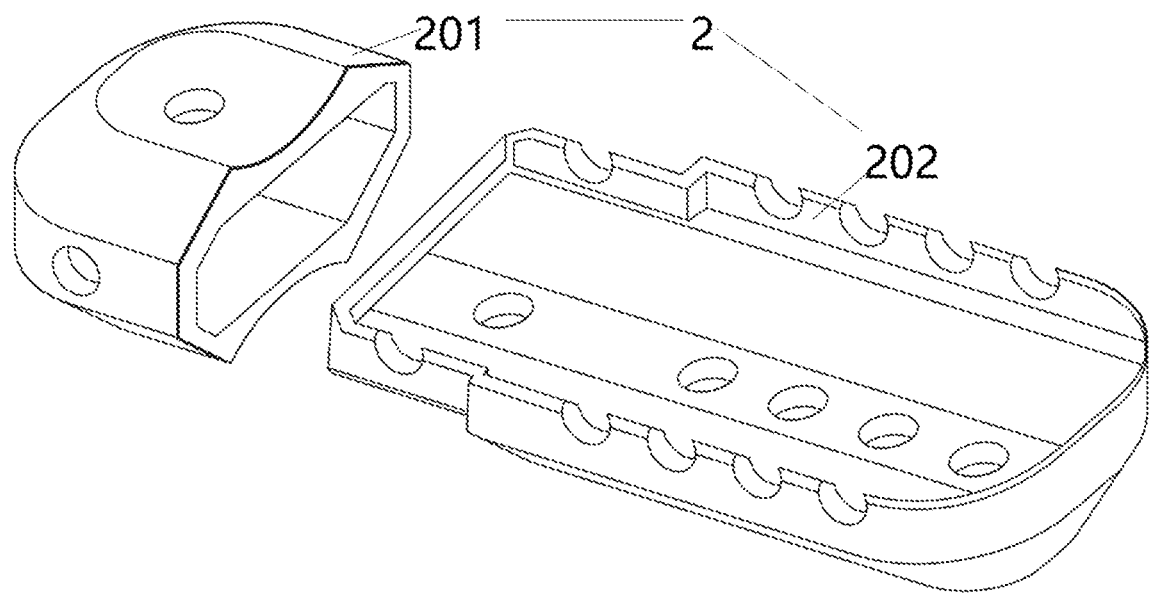
FIG. 3 is a schematic diagram of a split structure of the first fuel-modification device of the present invention.
Figure 4:
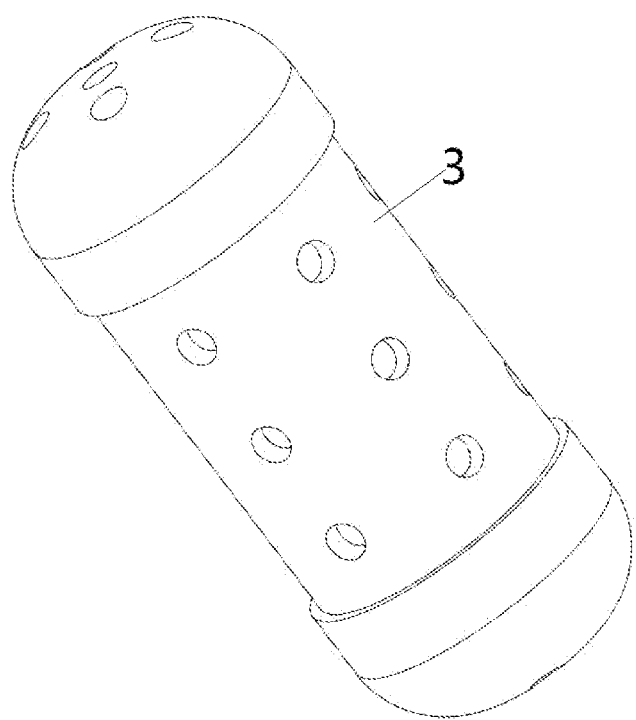
FIG. 4 is a schematic diagram of the structure of an air-refining device of the present invention.
Figure 5:
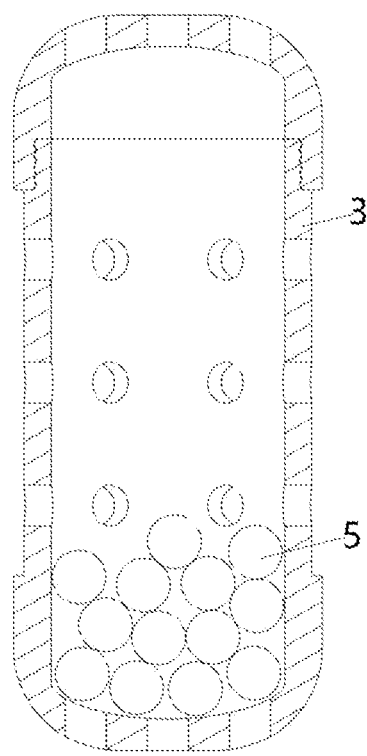
FIG. 5 is a cross-section view of the air-refining device of the present invention.
Figure 6:
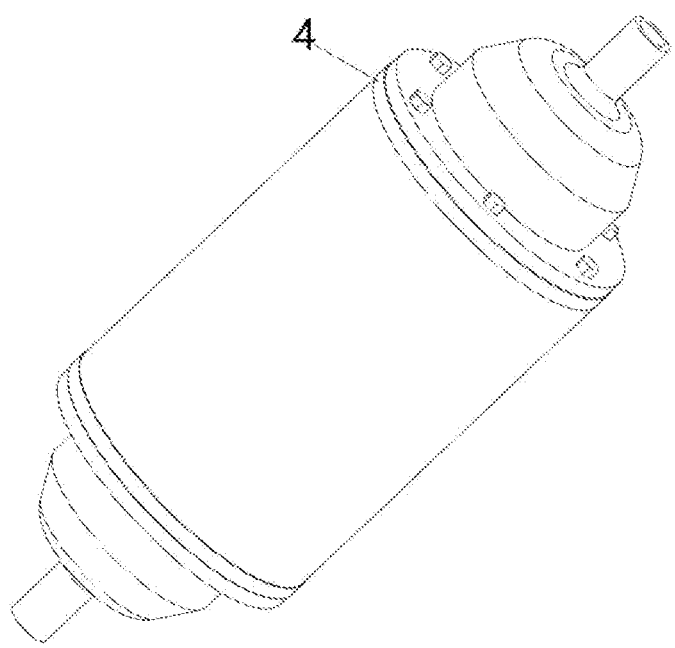
FIG. 6 is a schematic diagram of the structure of the tubing-type fuel-modification device of the present invention.
Figure 7:
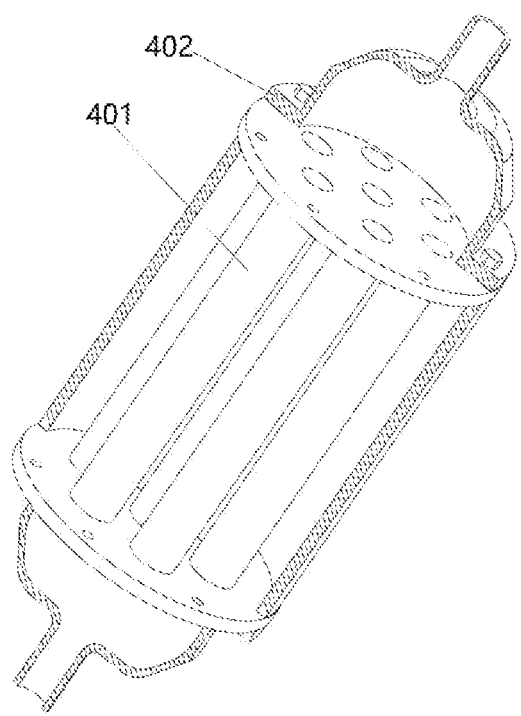
FIG. 7 is a schematic diagram of the internal mechanisms of the tubing-type fuel-modification device of the present invention.
Figure 8:
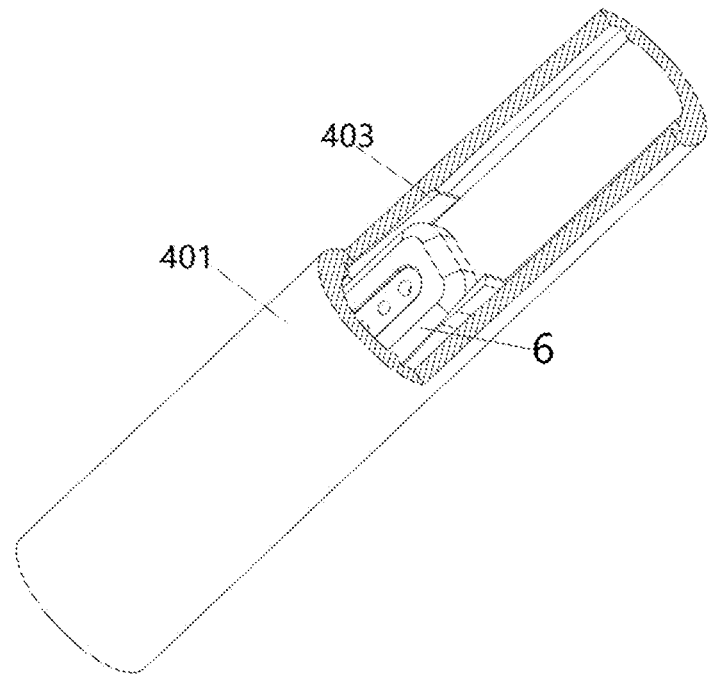
FIG. 8 is a schematic diagram of the inner structure of the tubular channels in the tubing-type fuel-modification device of the present invention.

As shown in FIGS. 1-8, the present invention discloses a fuel-efficient and fuel-saving device, which includes a first fuel-modification device 1, an air-refining device, and a tubing-type fuel-modification device. The first fuel-modification device 1 is arranged in a fuel tank. The air-refining device is arranged under a filter screen of an air filter of an internal combustion engine. The tubing-type fuel-modification device is arranged above a pipeline between the internal combustion engine and the fuel tank. The first fuel-modification device 1 includes a first metal box body 2 and a plurality of nano far-infrared ceramic particles 5. The first metal box body 2 is a flat cuboid structure, which is convenient for the first metal box body 2 to be sunk to the bottom of the fuel tank, thereby avoiding the danger caused by hanging the fuel-modification device in the fuel tank. The first metal box body 2 includes a box body 202 and a box cover 201. The bottom ends of the box cover 201 and the box body 202 are chamfered, which saves materials, makes the first fuel-modification device 1 more aesthetically pleasing and avoids collision with the fuel tank. The upper end and the lower end of the first metal box body 2 are provided with arc-shaped grooves. The surface of the first metal box body 2 has a plurality of uniformly arranged air holes. The plurality of nano far-infrared ceramic particles 5 is arranged in the first metal box body 2. The ball diameter of the nano far-infrared ceramic particles 5 is larger than the diameter of the air holes to prevent the nano far-infrared ceramic particles 5 from leaving the first metal box body 2 while the fuel fully contacts with the nano far-infrared ceramic particles 5.

The air-refining device includes a second metal box body 3 and a plurality of nano far-infrared ceramic particles 5. The second metal box body 3 is a cylindrical structure. The upper end and the lower end of the second metal box body 3 are provided with arc chamfers. The surface of the second metal box body 3 has a plurality of uniformly arranged air holes. The nano far-infrared ceramic particles 5 are arranged in the second metal box body 3. The ball diameter of the nano far-infrared ceramic particles 5 is larger than the diameter of the air holes. The air-refining device uses negative nano ions to release the negative charge of the oxygen molecule and thus make the oxygen molecule active, thereby improving the oxygen solubility of fuel molecules, effectively reducing the particles, dust, bacteria, and moisture in the air, and fully stimulating the activity of the air. The air-refining device is installed under the filter screen of the air filter so that the fuel molecules and oxygen can be uniformly mixed to achieve full combustion.

The tubing-type fuel-modification device includes a metal cylinder body 4 and a second fuel-modification device 6. A plurality of tubular channels 401 is arranged on the inside of the metal cylinder body 4. A hollow interface 402 is arranged on both sides of the metal cylinder body 4. One end of the hollow interface 402 is in communication with an inlet pipe, and the other end of the hollow interface 402 is in communication with an outlet pipe. Slots are arranged in the tubular channels 401, and elastic buckles 403 are arranged in the slots. The elastic buckles 403 are internally fixed with the second fuel-modification device 6. The elastic buckle 403 is arranged to facilitate the fixation of the second fuel-modification device 6. The designer may install a different plurality of the second fuel-modification devices 6 according to the customized requirements. Fuel enters from one side of the metal cylinder body 4, goes through the tubular channels 401 in the central part of the metal cylinder body 4, contacts the second fuel-modification device 6, and outputs to a combustion device from the other side of the metal cylinder body 4, thereby increasing combustion efficiency, saving fuel consumption, and increasing the output power. In this embodiment, the structure of the second fuel-modification device 6 is the same as the structure of the first fuel-modification device 1.

Nano far-infrared ceramic particles 5, specifically, the weight ratio of the composition of the nano far-infrared ceramic particles is 90% of kaolin and 10% of the remaining mixture. The weight ratio of the composition of the remaining mixture is 30%-40% of nano-titanium dioxide, 50%-70% of nano-zirconia, and 10%-20% of nano-tourmaline. The particle size of the nano-titanium dioxide, the nano-zirconia, and the nano-tourmaline is independently 1000-10000 mesh. By changing the diameter of nano far-infrared ceramic particles, the contact area between the nano far-infrared ceramic particles 5 and fuel is increased, thereby improving the fuel-saving rate of an internal combustion engine.

In the present invention, the far-infrared rays released by the nano far-infrared ceramic particles 5 can promote the stretch of molecular bonds and vibration of carbon-hydrogen molecules to increase the kinetic energy of the molecular bonds so that the molecular bonds are easier to break into smaller free radicals during combustion. This increases the possibility of fully and evenly mixing with oxygen for combustion and activates and facilitates efficient fuel combustion and reduction of exhaust emissions. At the same time, the special vibration frequencies can make gasoline molecules smaller, disintegrate, and re-organize to improve the activity of molecules, thereby effectively improving the performance of cars, reducing fuel consumption, reducing exhaust emissions, and enhancing the horsepower and torque of cars. Therefore, it is suitable for all kinds of internal combustion engines such as Diesel, Petrol, Bio-Diesel, Ethanol fuel, LPG, and LNG; automobiles, boilers, heating furnaces, heating devices, dryers, thermal processors, or other devices and machines which obtains power or heat through fuel combustion.

The above is only a preferred embodiment of the present invention and does not impose any limitation on the technical scope of the present invention. Therefore, any modification, equivalent change, or modification of the above embodiment based on the technical substance of the present invention still belongs to the scope of the technical solution of the present invention.

What is claimed is:

1. A fuel-efficient and fuel-saving device comprising a first fuel-modification device, an air-refining device, and a tubing-type fuel-modification device;
    wherein the first fuel-modification device is arranged in a fuel tank, the air-refining device is arranged under a filter screen of an air filter of an internal combustion engine, and the tubing-type fuel-modification device is arranged above a pipeline between the internal combustion engine and the fuel tank; and
    wherein the first fuel-modification device comprises a first metal box body and a first plurality of nano far-infrared ceramic particles; a surface of the first metal box body comprises a first plurality of air holes uniformly arranged on the surface of the first metal box body, the first plurality of nano far-infrared ceramic particles is arranged in the first metal box body, and a ball diameter of each of the first plurality of nano far-infrared ceramic particles is larger than a diameter of each of the first plurality of air holes.

2. The fuel-efficient and fuel-saving device according to claim 1, wherein the air-refining device comprises a second metal box body and a second plurality of nano far-infrared ceramic particles; a surface of the second metal box body comprises a second plurality of air holes uniformly arranged on the surface of the second metal box body, the second plurality of nano far-infrared ceramic particles is arranged in the second metal box body, and a ball diameter of each of the second plurality of nano far-infrared ceramic particles is larger than a diameter of each of the second plurality of air holes.

3. The fuel-efficient and fuel-saving device according to claim 2, wherein the second metal box body is a cylindrical structure, and an upper end and a lower end of the second metal box body are provided with arc chamfers.

4. The fuel-efficient and fuel-saving device according to claim 1, wherein the tubing-type fuel-modification device comprises a metal cylinder body and a second fuel-modification device; a plurality of tubular channels is arranged on an inside of the metal cylinder body, a hollow interface is arranged on two sides of the metal cylinder body, a first end of the hollow interface is in communication with an inlet pipe, and a second end of the hollow interface is in communication with an outlet pipe; slots are arranged in the plurality of tubular channels, elastic buckles are arranged in the slots, and the elastic buckles are internally fixed with the second fuel-modification device.

5. The fuel-efficient and fuel-saving device according to claim 4, wherein a structure of the first fuel-modification device and a structure of the second fuel-modification device are identical.

6. The fuel-efficient and fuel-saving device according to claim 1, wherein a composition of each of the first plurality of nano far-infrared ceramic particles is 90% of kaolin and 10% of a remaining mixture, and a composition of the remaining mixture is 30%-40% of nano-titanium dioxide, 50%-70% of nano-zirconia, and 10%-20% of nano-tourmaline.

7. The fuel-efficient and fuel-saving device according to claim 6, wherein a particle size of each of the nano-titanium dioxide, the nano-zirconia, and the nano-tourmaline particle is 1000-10000 mesh.

8. The fuel-efficient and fuel-saving device according to claim 1, wherein the first metal box body comprises a box body and a box cover; the box cover is covered on the box body, and bottom ends of the box cover and the box body are chamfered.

9. The fuel-efficient and fuel-saving device according to claim 1, wherein the first metal box body is a cuboid structure, and an upper end and a lower end of the first metal box body are provided with arc-shaped grooves.

* * * * *